United States Patent
Zhang et al.

(10) Patent No.: US 8,954,398 B1
(45) Date of Patent: Feb. 10, 2015

(54) SYSTEMS AND METHODS FOR MANAGING DEDUPLICATION REFERENCE DATA

(71) Applicant: Symantec Corporation, Mountain View, CA (US)

(72) Inventors: Xianbo Zhang, Plymouth, MN (US); Haibin She, Beijing (CN); Fanglu Guo, Los Angeles, CA (US); Chao Lei, Beijing (CN); Shuai Cheng, Beijing (CN); Haigang Wang, Beijing (CN); Dongxu Sun, Beijing (CN); Hongxing Guan, Beijing (CN); Wen Feng Jiang, Beijing (CN)

(73) Assignee: Symantec Corporation, Mountain View, CA (US)

( * ) Notice: Subject to any disclaimer, the term of this patent is extended or adjusted under 35 U.S.C. 154(b) by 219 days.

(21) Appl. No.: 13/734,901

(22) Filed: Jan. 4, 2013

(51) Int. Cl.
  *G06F 17/30* (2006.01)

(52) U.S. Cl.
  CPC ............................... *G06F 17/30156* (2013.01)
  USPC .......................................... 707/687; 707/692

(58) Field of Classification Search
  USPC ................................................. 707/687, 692
  See application file for complete search history.

(56) References Cited

U.S. PATENT DOCUMENTS

| | | | |
|---|---|---|---|
| 5,990,810 A | 11/1999 | Williams | |
| 6,209,003 B1* | 3/2001 | Mattis et al. | 1/1 |
| 6,308,185 B1* | 10/2001 | Grarup et al. | 1/1 |
| 6,633,579 B1* | 10/2003 | Tedijanto et al. | 370/432 |
| 7,069,279 B1* | 6/2006 | Rau et al. | 1/1 |
| 7,571,156 B1 | 8/2009 | Gupta et al. | |
| 8,108,446 B1 | 1/2012 | Christiaens | |
| 8,204,862 B1* | 6/2012 | Paulzagade et al. | 707/679 |
| 8,417,674 B2* | 4/2013 | Provenzano | 707/692 |
| 8,775,390 B2* | 7/2014 | Anglin et al. | 707/693 |
| 2004/0103182 A1* | 5/2004 | Krabel et al. | 709/223 |
| 2007/0100913 A1 | 5/2007 | Sumner et al. | |
| 2008/0288482 A1 | 11/2008 | Chaudhuri et al. | |
| 2009/0112945 A1* | 4/2009 | Camble et al. | 707/204 |
| 2009/0259701 A1 | 10/2009 | Wideman et al. | |
| 2010/0223441 A1 | 9/2010 | Lillibridge et al. | |
| 2011/0231362 A1 | 9/2011 | Attarde et al. | |
| 2011/0314396 A1* | 12/2011 | Diab et al. | 715/760 |

OTHER PUBLICATIONS

Xianbo Zhang et al.; Systems and Methods for Providing Increased Scalability in Deduplication Storage Systems; U.S. Appl. No. 13/007,301, filed Jan. 14, 2011.

(Continued)

*Primary Examiner* — Kim Nguyen
(74) *Attorney, Agent, or Firm* — ALG Intellectual Property, LLC (57) ABSTRACT

A method for managing deduplication reference data may include (1) identifying multiple of data containers configured to store a plurality of deduplicated data segments that are referenced by multiple data objects within a deduplicated data system, (2) maintaining multiple reference databases including (i) a first reference database corresponding to a first subset of the data containers and (ii) a second reference database corresponding to a second subset of the data containers, the second subset differing from the first subset, (3) determining that a data object references at least one segment within a first data container within the first subset but does not reference any data segment within a second data container within the second subset and (4) updating the first reference database with information specifying that the data object references at least one data segment within at least one data container within the first subset of data containers.

20 Claims, 7 Drawing Sheets

(56) References Cited

OTHER PUBLICATIONS

Trimbak Bardale; Systems and Methods for Securely Deduplicating Data Owned by Multiple Entities; U.S. Appl. No. 12/874,640, filed Sep. 2, 2010.

Benjamin Zhu, et al.; Avoiding the Disk Bottleneck in the Data Domain Deduplication File System; FAST '08: 6th USENIX Conference on File and Storage Technologies; 2008; pp. 269-282.

IBM; Disk-to-Disk-to-Hologram (D2D2H) With Partitioned-Intermediate-Disk to Support Data-Deduplication; The IP.com Journal; Nov. 10, 2008; ISSN: 1533-0001; IP.com, Inc.; West Henrietta, NY, US.

European Search Report received in related European application EP 11194388.2 on Apr. 2, 2012.

* cited by examiner

SYSTEMS AND METHODS FOR MANAGING DEDUPLICATION REFERENCE DATA

BACKGROUND

Deduplication storage systems are generally used to reduce the amount of storage space required to store files by identifying redundant data patterns within similar files. For example, a deduplication storage system may divide multiple files into file segments and then identify at least one file segment obtained from one file that is identical to at least one file segment obtained from another file. Rather than storing multiple instances of a particular file segment, the deduplication storage system may store a single instance of the file segment and allow multiple files to simply reference that instance of the file segment to reduce the amount of storage space required to store the files. As such, deduplication storage systems typically only store file segments that are unique (i.e., non-redundant).

In order to prevent stored file segments from being prematurely or erroneously removed, a deduplication storage system may maintain multiple reference objects (such as reference lists and/or reference counts) that each indicate whether one or more backed-up files currently reference a particular file segment. If a reference object indicates that no files are currently referencing a particular file segment, the deduplication storage system may remove that file segment and reclaim the storage space occupied by the same.

Traditional deduplication systems typically store such reference objects in a reference database. Unfortunately, if the reference database becomes corrupted, the traditional deduplication system may suffer data losses and/or storage leaks. Moreover, taking the traditional deduplication system offline to repair the reference database may fail to meet service level requirements. As such, the instant disclosure identifies a need for additional and improved systems and methods for managing deduplication reference data.

SUMMARY

As will be described in greater detail below, the instant disclosure generally relates to systems and methods for managing deduplication reference data by maintaining multiple reference databases, each of which stores reference information for a different subset of data containers within a deduplicated data system. In some examples, these systems and methods may perform inline reference updates and/or online checking of reference databases (e.g., to repair corrupted reference databases while maintaining access to the remaining reference databases).

In one example, a computer-implemented method for managing deduplication reference data may include (1) identifying a plurality of data containers configured to store a plurality of deduplicated data segments that are referenced by a plurality of data objects within a deduplicated data system, (2) maintaining a plurality of reference databases, the plurality of reference databases including (i) a first reference database that is configured to store information specifying which data objects within the plurality of data objects reference at least one data segment within a first subset of the plurality of data containers and (ii) a second reference database that is configured to store information specifying which data objects within the plurality of data objects reference at least one data segment within a second subset of the plurality of data containers, the second subset differing from the first subset, (3) determining that a data object references at least one segment within a first data container within the first subset of the plurality of data containers but that the data object does not reference any data segment within a second data container within the second subset of the plurality of data containers and (4) updating the first reference database with information specifying that the data object references at least one data segment within at least one data container within the first subset of the plurality of data containers.

In some examples, the computer-implemented method may also include detecting a backup image introduced to the deduplicated data system by a backup operation, the backup image including the data object. In these examples, updating the first reference database may precede marking the operation as successful.

In some embodiments, the computer-implemented method may also include (1) identifying a corrupted reference database within the plurality of reference databases and (2) while rebuilding the corrupted reference database, keeping the deduplicated data system online to allow (i) adding at least one data object to the deduplicated data system, (ii) retrieving at least one data object from the deduplicated data system, and/or (iii) removing at least one data object from the deduplicated data system.

In some examples, identifying the corrupted reference database may include checking a reference within a selected data object within the plurality of data objects that points to a referenced data segment within the plurality of data segments stored within a corresponding data container within the plurality of data containers and determining that the corrupted reference database does not correctly indicate that the selected data object references data stored within the corresponding data container. In these examples, the computer-implemented method may identify the corrupted reference database while the deduplicated data system is online.

In some embodiments, identifying the corrupted reference database may include identifying the corrupted reference database before a checking period designated for checking each data object within the deduplicated data system against each reference database within the plurality of reference databases. In these embodiments, rebuilding the corrupted reference database may include rebuilding the corrupted reference database during the checking period based at least in part on identifying the corrupted reference database before the checking period.

In some examples, keeping the deduplicated data system online may include allowing removal of at least one data object that does not reference any data segment stored in any data container corresponding to the corrupted reference database but blocking removal of a selected data object that does reference at least one data segment stored in at least one data container corresponding to the corrupted reference database.

In some embodiments, keeping the deduplicated data system online may include allowing removal of at least one data segment within the plurality of deduplicated data segments that is not stored in any data container corresponding to the corrupted reference database but blocking removal of at least one data segment stored in at least one data container corresponding to the corrupted reference database.

In one embodiment, a system for implementing the above-described method may include (1) an identification module programmed to identify a plurality of data containers configured to store a plurality of deduplicated data segments that are referenced by a plurality of data objects within a deduplicated data system, (2) a maintaining module programmed to maintain a plurality of reference databases, the plurality of reference databases including (i) a first reference database that is configured to store information specifying which data objects within the plurality of data objects reference at least one data segment within a first subset of the plurality of data containers and (ii) a second reference database that is configured to store information specifying which data objects within the plurality of data objects reference at least one data segment within a second subset of the plurality of data containers, the second subset differing from the first subset, (3) a determination module programmed to determine that a data object references at least one data segment within a first data container within the first subset of the plurality of data containers but that the data object does not reference any data segment within a second data container within the second subset of the plurality of data containers, and (4) an updating module programmed to update the first reference database with information specifying that the data object references at least one data segment within at least one data container within the first subset of the plurality of data containers. The system may also include at least one processor configured to execute the identification module, the maintaining module, the determination module and the updating module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a plurality of data containers configured to store a plurality of deduplicated data segments that are referenced by a plurality of data objects within a deduplicated data system, (2) maintain a plurality of reference databases, the plurality of reference databases including (i) a first reference database that is configured to store information specifying which data objects within the plurality of data objects reference at least one data segment within a first subset of the plurality of data containers and (ii) a second reference database that is configured to store information specifying which data objects within the plurality of data objects reference at least one data segment within a second subset of the plurality of data containers, the second subset differing from the first subset, (3) determine that a data object references at least one data segment within a first data container within the first subset of the plurality of data containers but that the data object does not reference any data segment within a second data container within the second subset of the plurality of data containers and (4) update the first reference database with information specifying that the data object references at least one data segment within at least one data container within the first subset of the plurality of data containers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing deduplication reference data. As will be explained in greater detail below, by maintaining multiple reference databases, each of which stores reference information for a different subset of data containers within a deduplicated data system, the systems and methods described herein may facilitate repairing references (and, e.g., thereby preventing data loss and/or storage leaks within the deduplicated data system) while maintaining access to the deduplicated data system. For example, these systems and methods may perform online checking of reference databases (e.g., to repair corrupted reference databases while maintaining access to the remaining reference databases). Additionally or alternatively, these systems and methods may perform inline reference updates (e.g., thereby preventing a corrupted transaction log from invalidating all reference databases).

Figure 1:
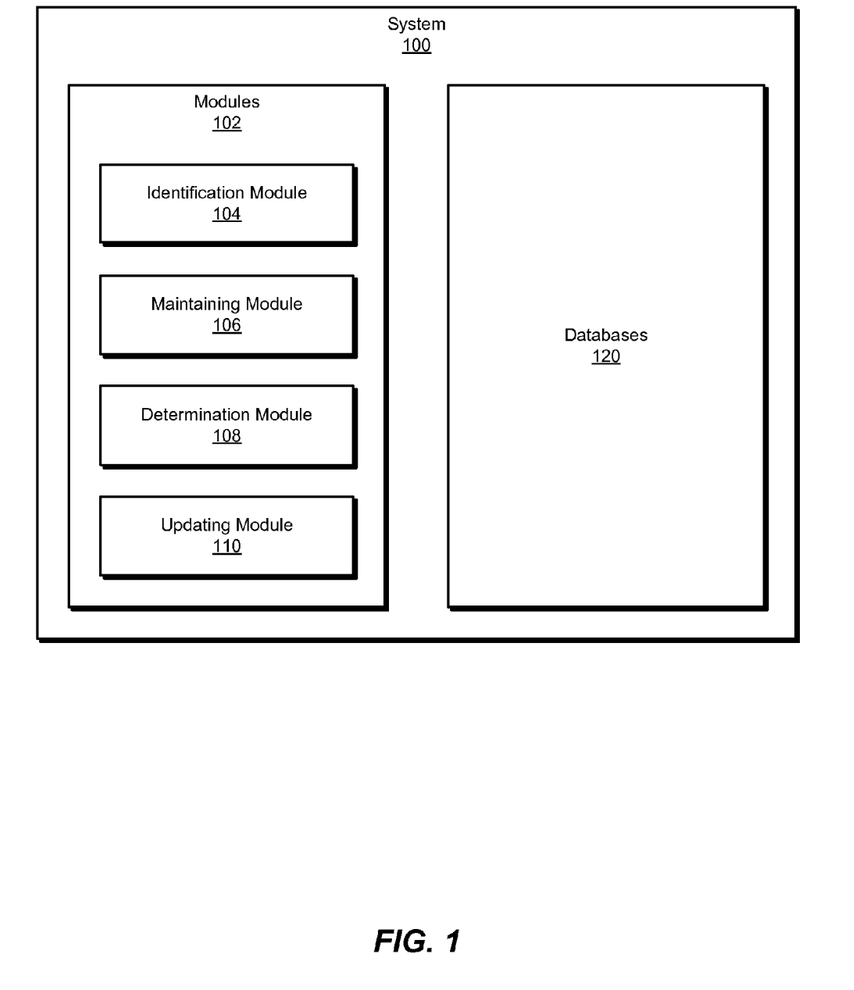
FIG. 1 is a block diagram of an exemplary system for managing deduplication reference data.
Figure 2:
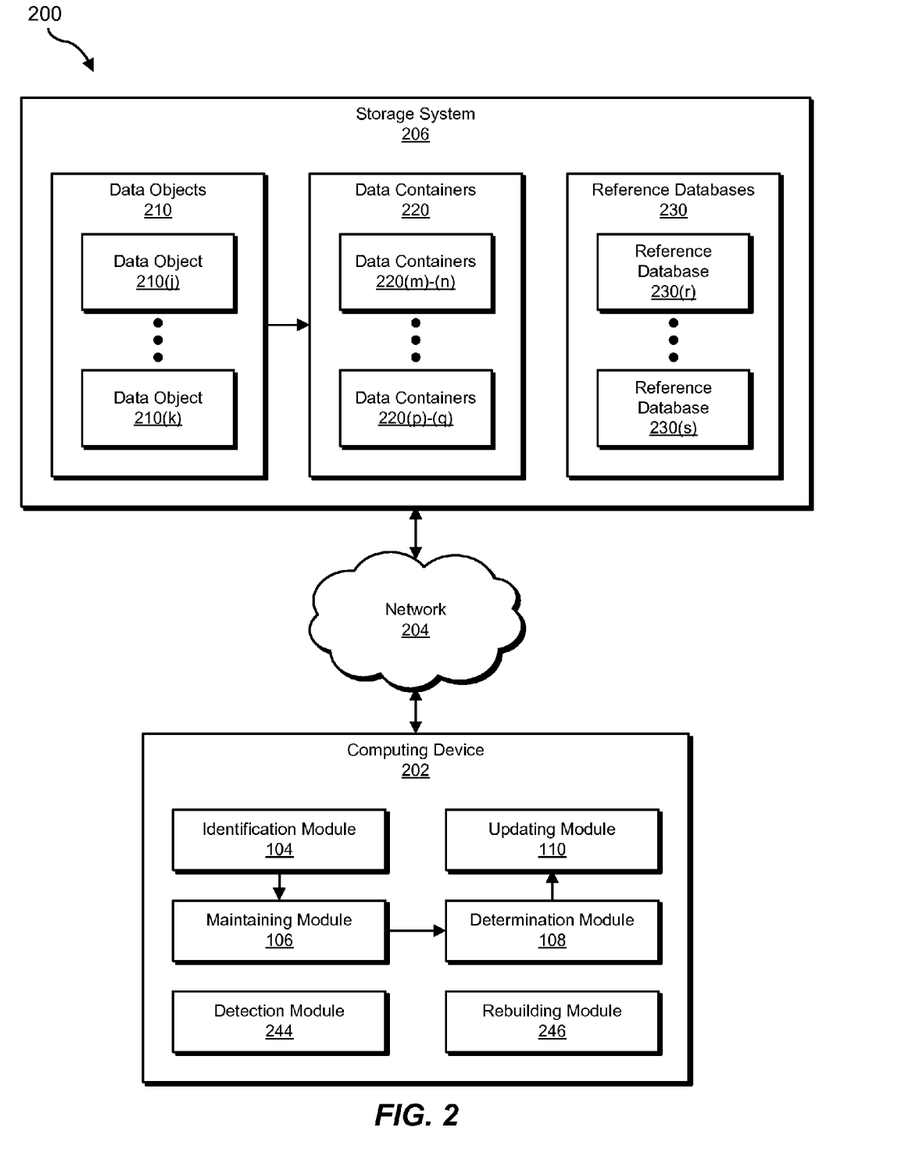
FIG. 2 is a block diagram of an exemplary system for managing deduplication reference data.

The following will provide, with reference to FIGS. 1-2, detailed descriptions of exemplary systems for managing deduplication reference data. Detailed descriptions of corresponding computer-implemented methods will also be provided in connection with FIG. 3. Detailed descriptions of an exemplary deduplicated data system will be provided in connection with FIG. 4. Detailed descriptions of an exemplary timeline for managing deduplicated reference data will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing deduplication reference data. As illustrated in this figure, exemplary system 100 may include one or more modules 102 for performing one or more tasks. For example, and as will be explained in greater detail below, exemplary system 100 may include an identification module 104 programmed to identify a plurality of data containers configured to store a plurality of deduplicated data segments that are referenced by a plurality of data objects within a deduplicated data system. Exemplary system 100 may also include a maintaining module 106 programmed to maintain a plurality of reference databases, the plurality of reference databases including (1) a first reference database that is configured to store information specifying which data objects within the plurality of data objects reference at least one data segment within a first subset of the plurality of data containers and (2) a second reference database that is configured to store information specifying which data objects within the plurality of data objects reference at least one data segment within a second subset of the plurality of data containers, the second subset differing from the first subset.

In addition, and as will be described in greater detail below, exemplary system 100 may include a determination module 108 programmed to determine that a data object references at least one data segment within a first data container within the first subset of the plurality of data containers but that the data object does not reference any data segment within a second data container within the second subset of the plurality of data containers. Exemplary system 100 may also include an updating module 110 programmed to update the first reference database with information specifying that the data object references at least one data segment within at least one data container within the first subset of the plurality of data containers. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or storage system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as databases 120. In one example, databases 120 may be configured to store reference data linking data objects and/or images to data containers. Additionally or alternatively, databases 120 may store deduplicated data segments and/or lists of data segments constituting data objects.

Databases 120 may represent portions of a single computing device or a plurality of computing devices. For example, databases 120 may represent a portion of storage system 206 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as storage system 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a storage system 206 via a network 204. Computing device 202 may be programmed with one or more of modules 102 and/or may store all or a portion of the data in databases 120. Additionally or alternatively, storage system 206 may be programmed with one or more of modules 102 and/or may store all or a portion of the data in databases 120.

In one embodiment, one or more of modules 102 from FIG. 1 may, when executed by at least one processor of computing device 202 and/or storage system 206, facilitate computing device 202 and/or storage system 206 in managing deduplication reference data. In one example, storage system 206 may store may store data for a deduplicated data system and computing device 202 may manage data stored on storage system 206 for the deduplicated data system. For example, and as will be described in greater detail below, one or more of modules 102 may cause computing device 202 and/or storage system 206 to (1) identify data containers 220 configured to store a plurality of deduplicated data segments that are referenced by data objects 210 within a deduplicated data system, (2) maintain reference databases 230, reference databases 230 including (i) a reference database 230($r$) that is configured to store information specifying which data objects within data objects 210 reference at least one data segment within data containers 220($m$)-($n$) and (ii) a reference database 230($s$) that is configured to store information specifying which data objects within data objects 210 reference at least one data segment within data containers 220($p$)-($q$), (3) determine that a data object 210($j$) references at least one data segment within data container 220($m$) but that data object 210($j$) does not reference any data segment within data container 220($p$) and (4) update reference database 230($r$) with information specifying that data object 210($j$) references at least one data segment within at least one data container within data containers 220($m$)-($n$).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Storage system 206 generally represents any type or form of computing device that is capable of storing, retrieving, relaying, and/or accessing data. Examples of storage system 206 include, without limitation, storage arrays and deduplication appliances.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and storage system 206.

Figure 3:
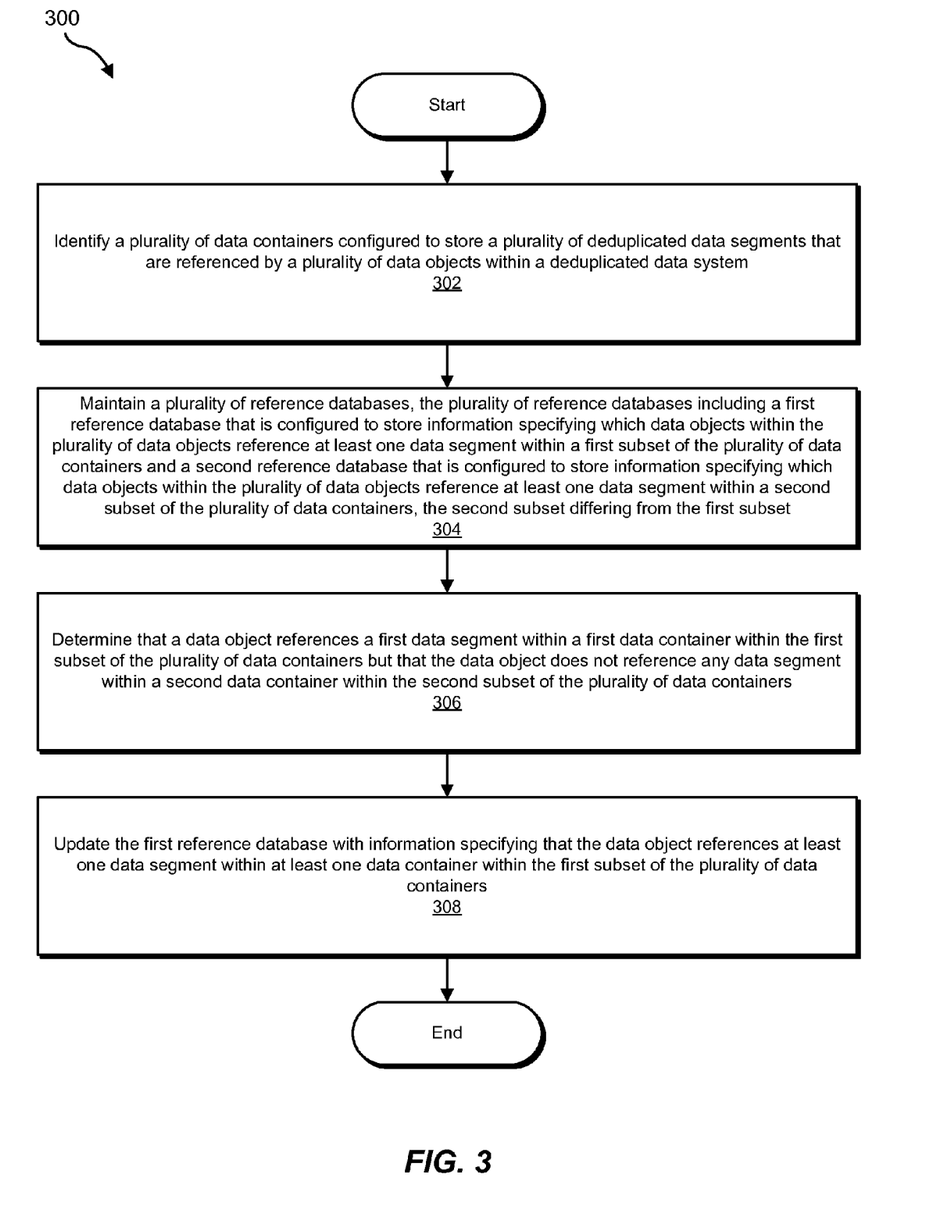
FIG. 3 is a flow diagram of an exemplary method for managing deduplication reference data.

FIG. 3 is a flow diagram of an exemplary computer-implemented method 300 for managing deduplication reference data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a plurality of data containers configured to store a plurality of deduplicated data segments that are referenced by a plurality of data objects within a deduplicated data system. For example, at step 302 identification module 104 may, as part of computing device 202 in FIG. 2, identify data containers 220 configured to store a plurality of deduplicated data segments that are referenced by data objects 210 within a deduplicated data system.

As used herein, the phrase "deduplicated data system" may refer to any type or form of storage system and/or device capable of identifying redundant data patterns within a collection of data and eliminating such redundancy by only storing a single instance of data. For example, the deduplicated data system may deduplicate data segments across multiple backup images. As used herein, the phrase "data object" may refer to any image, file, database, and/or other object capable of deduplicated storage. For example, the phrase "data object" may refer to a backup image and/or a file within a backup image. In some examples, the phrase "data object" may refer to a list of references to one or more data segments. As used herein, the phrase "data segment" may refer to any unit of data. Examples of a data segment include, but are not limited to, a portion of a file, a portion of an image, a data block, a file, a portion of a data stream, and/or a database entry. As used herein, the phrase "data container" may refer to a collection of deduplicated data segments stored for reference within a deduplicated data system.

Identification module 104 may identify the plurality of data containers in any of a variety of ways. For example, identification module 104 may read a configuration file and/or registry that identifies the plurality of data containers. Additionally or alternatively, identification module 104 may receive a communication from the deduplicated data system (e.g., via an application programming interface) identifying the plurality of data containers. In some examples, identification module 104 may identify the plurality of data containers by operating as a part of the deduplicated data system.

Figure 4:
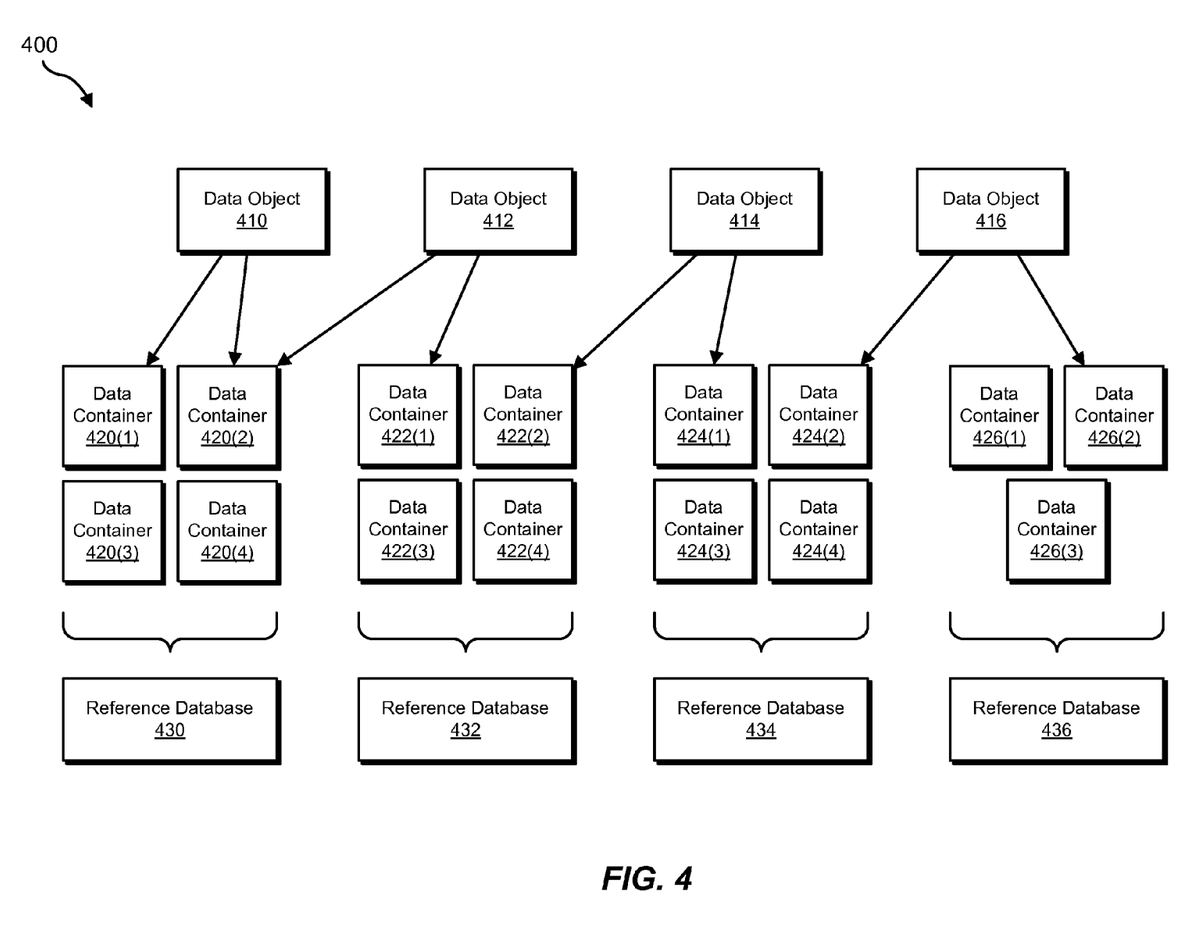
FIG. 4 is a block diagram of an exemplary deduplication system.

FIG. 4 illustrates an exemplary deduplicated data system 400. As shown in FIG. 4, deduplicated data system 400 may store various data objects, including data objects 410, 412, 414, and 416, by storing deduplicated data segments in data containers 420(1)-(4), 422(1)-(4), 424(1)-(4), and 426(1)-(3). For example, deduplicated data system 400 may store data object 410 as a list of references to deduplicated data segments stored in data containers 420(1) and 420(2). Deduplicated data system 400 may store data object 412 as a list of references to deduplicated data segments stored in data containers 420(2) and 422(1). Deduplicated data system 400 may store data object 414 as a list of references to deduplicated data segments stored in data containers 422(2) and 424(1). Deduplicated data system 400 may store data object 416 as a list of references to deduplicated data segments stored in data containers 424(2) and 426(2).

Returning to FIG. 3, at step 304 one or more of the systems described herein may identify a plurality of data containers configured to maintain a plurality of reference databases, the plurality of reference databases including (1) a first reference database that is configured to store information specifying which data objects within the plurality of data objects reference at least one data segment within a first subset of the plurality of data containers and (2) a second reference database that is configured to store information specifying which data objects within the plurality of data objects reference at least one data segment within a second subset of the plurality of data containers, the second subset differing from the first subset. For example, at step 304 maintaining module 106 may, as part of computing device 202 in FIG. 2, maintain reference databases 230, reference databases 230 including (i) a reference database 230($r$) that is configured to store information specifying which data objects within data objects 210 reference at least one data segment within data containers 220($m$)-($n$) and (ii) a reference database 230($s$) that is configured to store information specifying which data objects within data objects 210 reference at least one data segment within data containers 220($p$)-($q$).

As used herein, the phrase "reference database" may refer to any database, file, and/or other data structure for storing information about which data objects within a deduplicated data system reference which data containers within the deduplicated data system. For example, a reference database may list one or more data containers referenced by one or more backup images. Additionally or alternatively, a reference database may list one or more data objects that reference one or more deduplicated data segments stored within one or more data containers. In some examples, a deduplicated data system may use a reference database while determining whether a deduplicated data segment within a data container is still referenced or whether the deduplicated data segment may be deleted.

Maintaining module 106 may maintain the plurality of reference databases in any suitable manner. For example, maintaining module 106 may identify a grouping of the plurality of data containers, and maintain a reference database for each group of data containers. In this example, a reference database may store information about which data objects within the deduplicated data system reference which data containers within the group of data containers corresponding to the reference database. In some examples, maintaining module 106 may maintain a balanced grouping of data containers (e.g., by evenly distributing data containers among groups by number, by activity, etc.). In some examples, maintaining module 106 may identify a change to the plurality of data objects and determine that a reference database within the plurality of reference databases is implicated in the change by determining that a reference to a data container corresponding to the reference database has been added and/or removed by the change. Accordingly, maintaining module 106 may update the identified reference database without updating other reference databases not implicated in the change.

Using FIG. 4 as an example, deduplicated data system 400 may include a reference database 430 that stores information indicating which data containers within data containers 420 (1)-(4) are referenced by which data objects. For example, reference database 430 may store information indicating that data container 420(1) is referenced by data object 410 and data container 420(2) is referenced by data objects 410 and 412. Likewise, reference database 432 may store information indicating that data container 422(1) is referenced by data object 412 and data container 422(2) is referenced by data object 414. Similarly, reference database 434 may store information indicating that data container 424(1) is referenced by data object 414 and data container 424(2) is referenced by data object 416. Likewise, reference database 436 may store information indicating that data container 426(2) is referenced by data object 416.

Returning to FIG. 3, at step 306 one or more of the systems described herein may determine that a data object references at least one data segment within a first data container within the first subset of the plurality of data containers but that the data object does not reference any data segment within a second data container within the second subset of the plurality of data containers. For example, at step 306 determination module 108 may, as part of computing device 202 in FIG. 2, determine that a data object 210($j$) references at least one data segment within data container 220($m$) but that data object 210($j$) does not reference any data segment within data container 220($p$).

Determination module 108 may determine that the data object references the data segment within the first data container in any suitable context. For example, determination module 108 may determine that the data object references the data segment when the data object is added to the deduplicated data system. For example, determination module 108 may calculate a hash of the data segment and search the plurality of data containers for the data segment based on the hash. Determination module 108 may thereby determine that the first data container stores the data segment. Additionally or alternatively, determination module 108 may determine that no data container already includes the data segment and select the first data container for storing the data segment.

Determination module 108 may determine that the data object does not reference any data segment within the second data container in any suitable manner. For example, determination module 108 may search for hashes of the data segments within the data object among the plurality of data containers and identify no match with the second data container. Accordingly, the data object may reference data segments pertaining to the first subset of data containers without referencing data segments pertaining to the second subset of data containers.

Using FIG. 4 as an example, determination module 108 may determine that data object 410 references at least one data segment within data containers 420(1)-(4) but that data object 410 does not reference any data segment within data containers 422(1)-(4).

Returning to FIG. 3, at step 308 one or more of the systems described herein may update the first reference database with information specifying that the data object references at least one data segment within at least one data container within the first subset of the plurality of data containers. For example, at step 308 updating module 110 may, as part of computing device 202 in FIG. 2, update reference database 230(r) with information specifying that data object 210(j) references at least one data segment within at least one data container within data containers 220(m)-(n).

Updating module 110 may update the first reference database with the information in any suitable manner. For example, updating module 110 may update the first reference database to specify that the data segment within a specified data container within the first subset is referenced by the data object. Using FIG. 4 as an example, updating module 110 may update reference database 430 with information specifying that at least one data segment within data container 420(1) is referenced by data object 410.

In some examples, one or more of the systems described herein may also detect a backup image introduced into the deduplicated data system by a backup operation, the backup image including the data object. For example, a detection module 244 may, as a part of computing device 202 in FIG. 2, may detect data object 210(j) introduced into the deduplicated data system (e.g., into data objects 210 on storage system 206) by a backup operation.

Detection module 244 may detect the backup image in any suitable manner. For example, detection module 244 may detect the backup image by identifying an operation writing the backup image to the deduplicated data system. Additionally or alternatively, detection module 244 may detect the backup image by observing the execution of at least a part of the backup operation. Additionally or alternatively, detection module 244 may receive a message from a backup system identifying the backup image.

Once detection module 244 detects the backup image, in some examples updating module 110 may update the first reference database before marking the backup operation as successful. For example, a backup system performing the backup operation may perform the backup operation as an overarching transaction. In some examples, the backup system may mark the backup image as unusable, corrupt, and/or failed if the backup operation is not successful. Additionally or alternatively, the backup system may repeat and/or restart the backup operation and/or a portion of the backup operation if the backup operation is not successful. Accordingly, one or more of the systems described herein (e.g., including detection module 244 and/or updating module 110) may perform an inline reference update (e.g., updating one or more reference databases corresponding to the backup image during and/or as a part of the backup operation). In some examples, by updating the reference database using an inline reference update, the systems and methods described herein may preserve the validity of all of the plurality of reference databases. For example, if a transaction log involved in storing the backup image in the deduplicated data system were corrupted, without an inline reference update the deduplication system may be unable to guarantee that the backup image does not reference any given data containers within the deduplicated data system. Accordingly, by performing the inline reference update, the systems and methods may prevent such an error from invalidating unrelated data containers within the deduplicated data system.

In some embodiments, one or more of the systems described herein may also rebuild one or more of the reference databases within the plurality of references databases. For example, a rebuilding module 246 may, as a part of computing device 202 in FIG. 2, (1) identify a corrupted reference database within the plurality of reference databases and (2) while rebuilding the corrupted reference database, keep the deduplicated data system online to allow (i) adding at least one data object to the deduplicated data system, (ii) retrieving at least one data object from the deduplicated data system, and/or (iii) removing at least one data object from the deduplicated data system.

Rebuilding module 246 may identify the corrupted reference database in any suitable manner. In some examples, rebuilding module 246 may identify a fault in an underlying storage device that stores the corrupted reference database. Additionally or alternatively, the reference database may be corrupted by being missing. Accordingly, rebuilding module 246 may identify the corrupted reference database by identifying a missing reference database.

In some examples, rebuilding module 246 may identify the corrupted reference database by checking a reference within a selected data object within the plurality of data objects that points to a referenced data segment within the plurality of data segments stored within a corresponding data container within the plurality of data containers and determining that the corrupted reference database does not correctly indicate that the selected data object references data stored within the corresponding data container. In these examples, rebuilding module 246 may identify the corrupted reference database while the deduplicated data system is online. For example, the deduplicated data system may add a data object to, retrieve a data object from, and/or remove a data object from the deduplicated data system while rebuilding module 246 identifies the corrupted reference database.

In some examples, rebuilding module 246 may periodically check the plurality of reference databases. For example, rebuilding module 246 may identify the corrupted reference database before a checking period designated for checking each data object within the deduplicated data system against each reference database within the plurality of reference databases. In this example, rebuilding module 246 may rebuild the corrupted reference database during the checking period based at least in part on having identified the corrupted reference database before the checking period.

Figure 5:
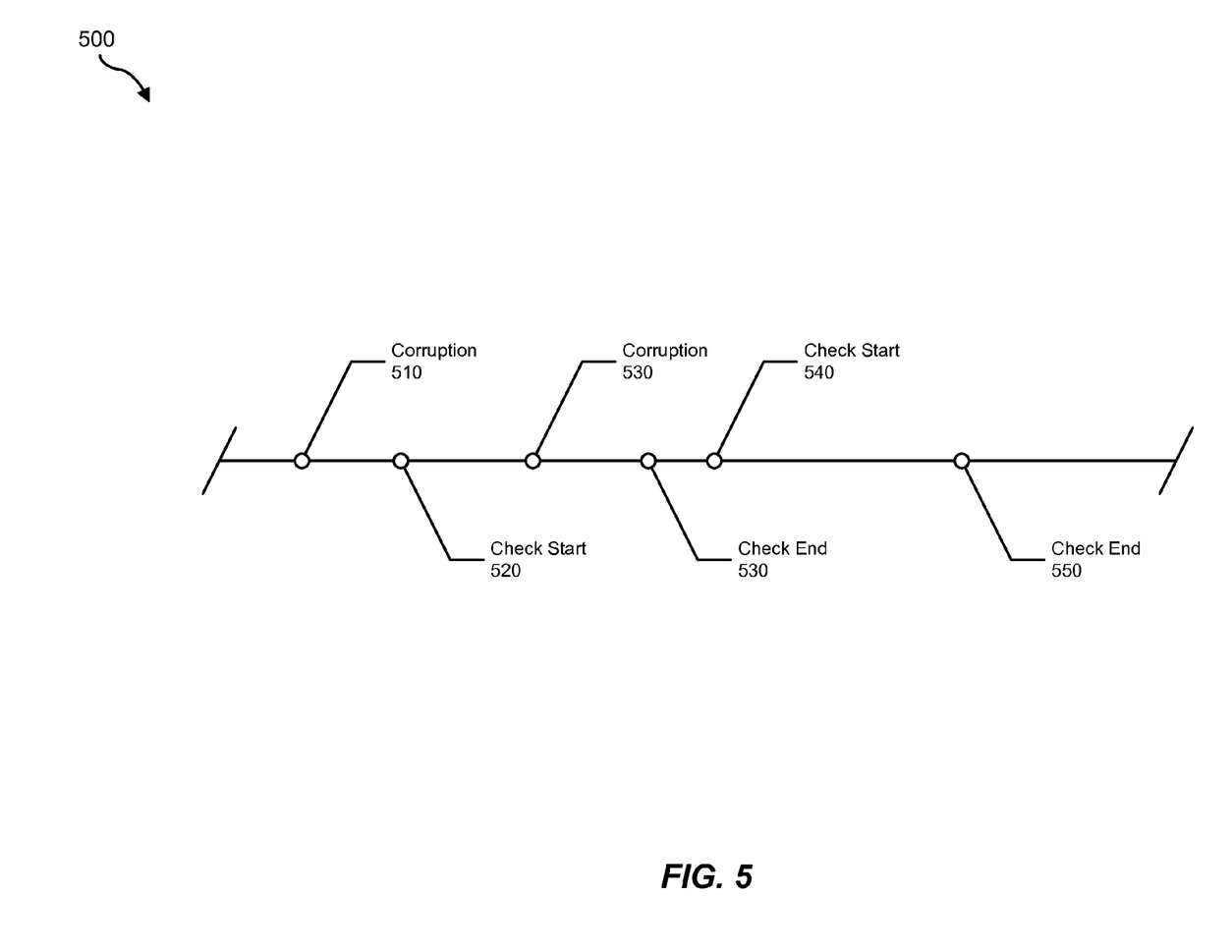
FIG. 5 is a block diagram of an exemplary timeline for managing deduplication reference data.

FIG. 5 illustrates an exemplary timeline 500. As shown in FIG. 5, a corruption 510 of a first reference database may occur before a check start 520 of a first checking period. During the first checking period, a corruption 530 of a second reference database may occur before a check end 530 of the first checking period. A check start 540 and a check end 550 may show the bounds of a second checking period. Using FIG. 5 as an example, rebuilding module 246 may fix corruption 510 during the first checking period based at least in part on corruption 510 occurring before check start 520. However, rebuilding module 246 may not fix corruption 530 during the first checking period based at least in part on corruption 530 occurring after check start 520. Instead, rebuilding module 246 may fix corruption 530 during the second checking period based at least in part on corruption 530 occurring before check start 540.

In some examples, rebuilding module 246 may keep the deduplicated data system online by allowing removal of at least one data object that does not reference any data segment stored in any data container corresponding to the corrupted reference database but blocking removal of a selected data object that does reference at least one data segment stored in at least one data container corresponding to the corrupted reference database. Additionally or alternatively, rebuilding module 246 may keep the deduplicated data system online by allowing removal of at least one data segment within the plurality of deduplicated data segments that is not stored in any data container corresponding to the corrupted reference database but blocking removal of at least one data segment stored in at least one data container corresponding to the corrupted reference database.

As explained above, by maintaining multiple reference databases, each of which stores reference information for a different subset of data containers within a deduplicated data system, the systems and methods described herein may facilitate repairing references (and, e.g., thereby preventing data loss and/or storage leaks within the deduplicated data system) while maintaining access to the deduplicated data system. For example, these systems and methods may perform online checking of reference databases (e.g., to repair corrupted reference databases while maintaining access to the remaining reference databases). Additionally or alternatively, these systems and methods may perform inline reference updates (e.g., thereby preventing a corrupted transaction log from invalidating all reference databases).

By maintaining multiple partitioned reference databases, a corruption within one of the reference databases may be contained, allowing the deduplicated data system to remain online as the corrupted reference database is repaired (e.g., allowing deletion operations, backup operations that use the deduplicated data system for storage, etc.), preventing only data containers corresponding to the corrupted reference database from contributing to deletion operations. Once the corrupted reference database is repaired, deletion operations relying on data containers corresponding to the previously corrupted reference database may resume.

Figure 6:
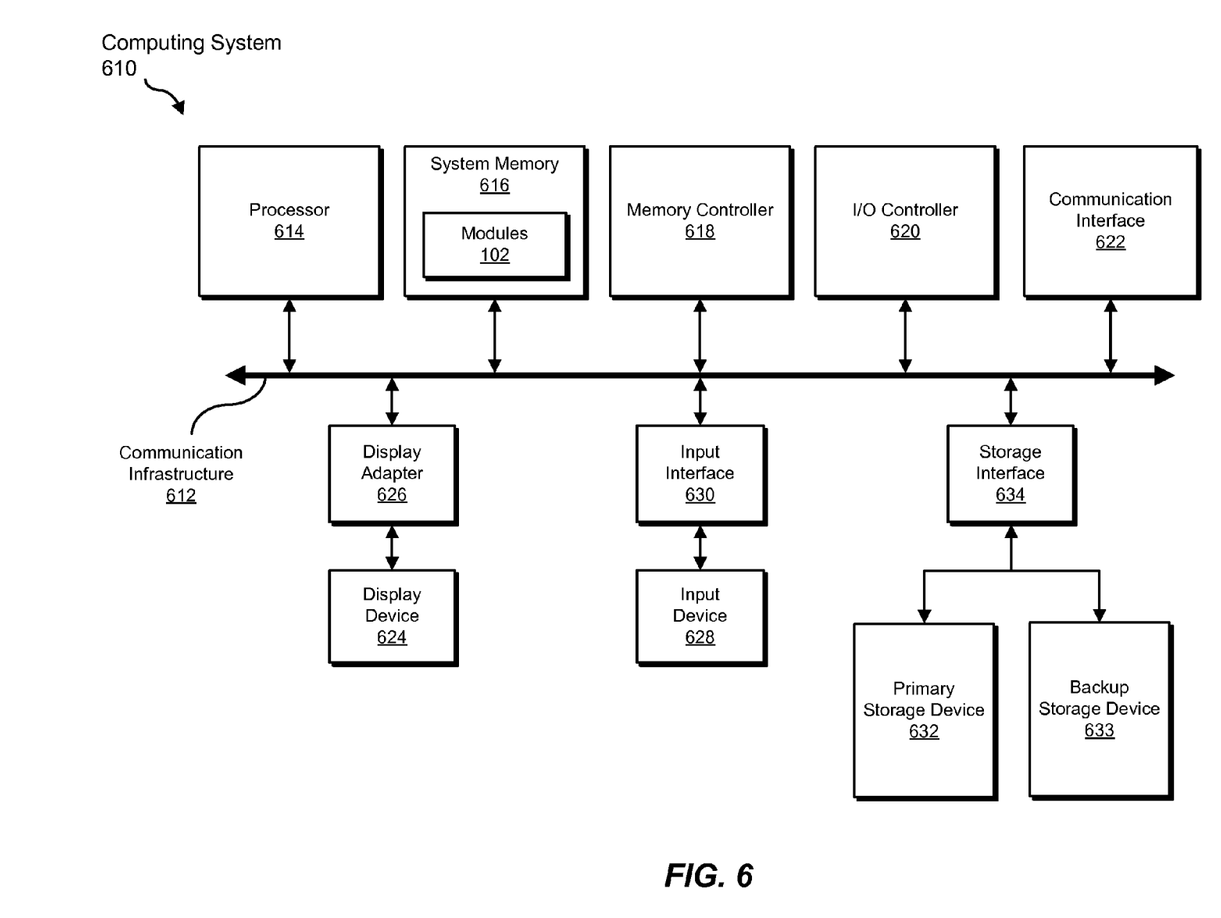
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, maintaining, determining, updating, detecting, rebuilding, keeping, allowing, and checking steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
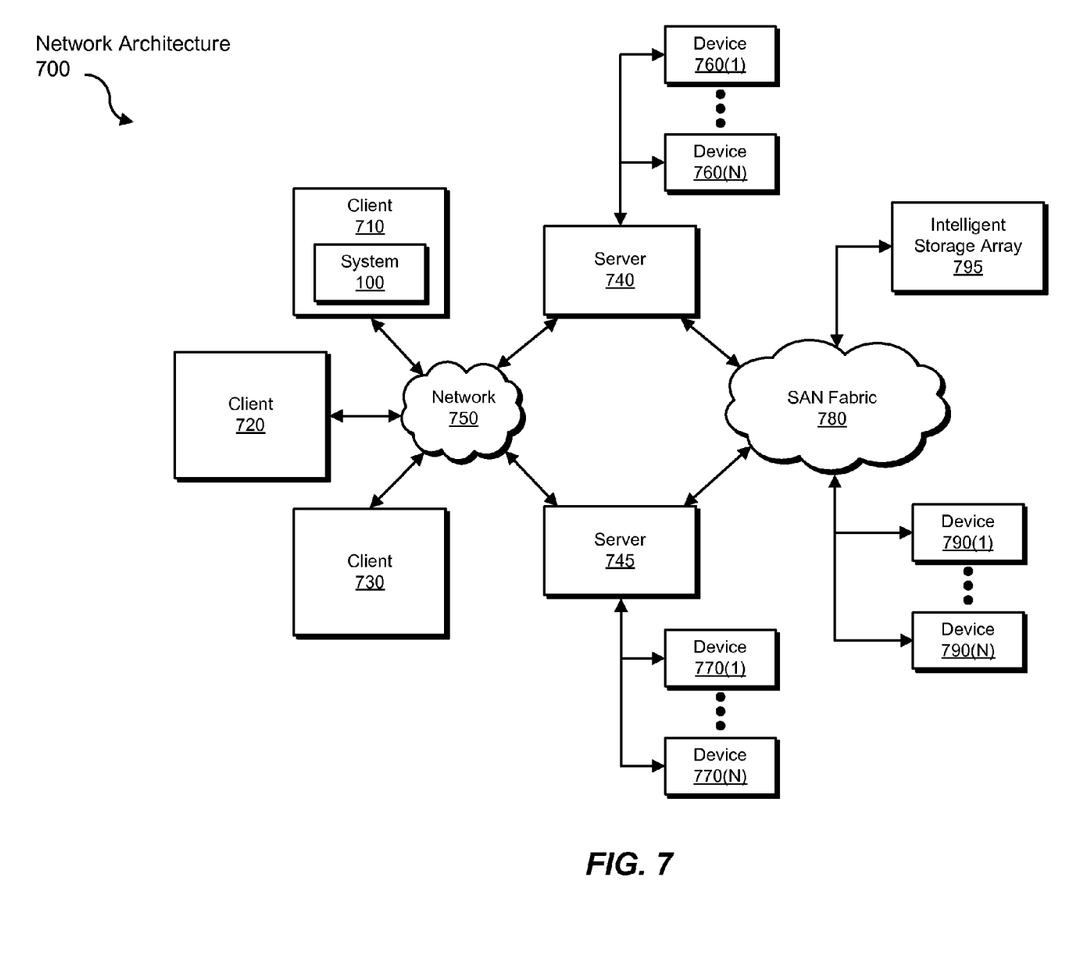
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, maintaining, determining, updating, detecting, rebuilding, keeping, allowing, and checking steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing deduplication reference data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a reference database to be transformed, transform the reference database by repairing the reference database, output a result of the transformation to a deduplicated data system, use the result of the transformation to track reference information (e.g., to facilitate data removal from deduplicated data systems), and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing deduplication reference data, at least a portion of the method being performed by a computing device comprising at least one processor, the method comprising:
    identifying a plurality of data containers configured to store a plurality of deduplicated data segments that are referenced by a plurality of data objects within a deduplicated data system;
    maintaining a plurality of reference databases, the plurality of reference databases comprising:
        a first reference database that is configured to store information specifying which data objects within the plurality of data objects reference at least one data segment within a first subset of the plurality of data containers;
        a second reference database that is configured to store information specifying which data objects within the plurality of data objects reference at least one data segment within a second subset of the plurality of data containers, the second subset differing from the first subset;
    determining that a data object references at least one data segment within a first data container within the first subset of the plurality of data containers but that the data object does not reference any data segment within a second data container within the second subset of the plurality of data containers;
    updating the first reference database with information specifying that the data object references at least one data segment within at least one data container within the first subset of the plurality of data containers.

2. The computer-implemented method of claim 1,
    further comprising detecting a backup image introduced to the deduplicated data system by a backup operation, the backup image comprising the data object;
    wherein updating the first reference database precedes marking the backup operation as successful.

3. The computer-implemented method of claim 1, further comprising:
    identifying a corrupted reference database within the plurality of reference databases;
    while rebuilding the corrupted reference database, keeping the deduplicated data system online to allow at least one of:
        adding at least one data object to the deduplicated data system;
        retrieving at least one data object from the deduplicated data system;
        removing at least one data object from the deduplicated data system.

4. The computer-implemented method of claim 3, wherein identifying the corrupted reference database comprises checking a reference within a selected data object within the plurality of data objects that points to a referenced data segment within the plurality of data segments stored within a corresponding data container within the plurality of data containers and determining that the corrupted reference database does not correctly indicate that the selected data object references data stored within the corresponding data container.

5. The computer-implemented method of claim 4, wherein identifying the corrupted reference database further comprises identifying the corrupted reference database while the deduplicated data system is online.

6. The computer-implemented method of claim 3, wherein:
    identifying the corrupted reference database comprises identifying the corrupted reference database before a checking period designated for checking each data object within the deduplicated data system against each reference database within the plurality of reference databases;
    rebuilding the corrupted reference database comprises rebuilding the corrupted reference database during the checking period based at least in part on identifying the corrupted reference database before the checking period.

7. The computer-implemented method of claim 3, wherein keeping the deduplicated data system online to allow removing at least one data object from the deduplicated data system comprises allowing removal of at least one data object that does not reference any data segment stored in any data container corresponding to the corrupted reference database but blocking removal of a selected data object that does reference at least one data segment stored in at least one data container corresponding to the corrupted reference database.

8. The computer-implemented method of claim 3, wherein keeping the deduplicated data system online to allow removing at least one data object from the deduplicated data system comprises allowing removal of at least one data segment within the plurality of deduplicated data segments that is not stored in any data container corresponding to the corrupted reference database but blocking removal of at least one data segment stored in at least one data container corresponding to the corrupted reference database.

9. A system for managing deduplication reference data, the system comprising:
- an identification module programmed to identify a plurality of data containers configured to store a plurality of deduplicated data segments that are referenced by a plurality of data objects within a deduplicated data system;
- a maintaining module programmed to maintain a plurality of reference databases, the plurality of reference databases comprising:
  - a first reference database that is configured to store information specifying which data objects within the plurality of data objects reference at least one data segment within a first subset of the plurality of data containers;
  - a second reference database that is configured to store information specifying which data objects within the plurality of data objects reference at least one data segment within a second subset of the plurality of data containers, the second subset differing from the first subset;
- a determination module programmed to determine that a data object references at least one data segment within a first data container within the first subset of the plurality of data containers but that the data object does not reference any data segment within a second data container within the second subset of the plurality of data containers;
- an updating module programmed to update the first reference database with information specifying that the data object references at least one data segment within at least one data container within the first subset of the plurality of data containers;
- at least one processor configured to execute the identification module, the maintaining module, the determination module and the updating module.

10. The system of claim 9,
further comprising a detection module programmed to detect a backup image introduced to the deduplicated data system by a backup operation, the backup image comprising the data object;
wherein the updating module is programmed to update the first reference database precedes marking the backup operation as successful.

11. The system of claim 9, further comprising a rebuilding module programmed to:
- identify a corrupted reference database within the plurality of reference databases;
- while rebuilding the corrupted reference database, keep the deduplicated data system online to allow at least one of:
  - adding at least one data object to the deduplicated data system;
  - retrieving at least one data object from the deduplicated data system;
  - removing at least one data object from the deduplicated data system.

12. The system of claim 11, wherein the rebuilding module is programmed to identify the corrupted reference database by checking a reference within a selected data object within the plurality of data objects that points to a referenced data segment within the plurality of data segments stored within a corresponding data container within the plurality of data containers and determining that the corrupted reference database does not correctly indicate that the selected data object references data stored within the corresponding data container.

13. The system of claim 12, wherein the rebuilding module is programmed to identify the corrupted reference database further by identifying the corrupted reference database while the deduplicated data system is online.

14. The system of claim 11, wherein:
- the rebuilding module is programmed to identify the corrupted reference database by identifying the corrupted reference database before a checking period designated for checking each data object within the deduplicated data system against each reference database within the plurality of reference databases;
- the rebuilding module is programmed to rebuild the corrupted reference database by rebuilding the corrupted reference database during the checking period based at least in part on identifying the corrupted reference database before the checking period.

15. The system of claim 11, wherein the rebuilding module is programmed to keep the deduplicated data system online to allow removing at least one data object from the deduplicated data system by allowing removal of at least one data object that does not reference any data segment stored in any data container corresponding to the corrupted reference database but blocking removal of a selected data object that does reference at least one data segment stored in at least one data container corresponding to the corrupted reference database.

16. The system of claim 11, wherein the rebuilding module is programmed to keep the deduplicated data system online to allow removing at least one data object from the deduplicated data system by allowing removal of at least one data segment within the plurality of deduplicated data segments that is not stored in any data container corresponding to the corrupted reference database but blocking removal of at least one data segment stored in at least one data container corresponding to the corrupted reference database.

17. A non-transitory computer-readable-storage medium comprising one or more computer-readable instructions that, when executed by at least one processor of a computing device, cause the computing device to:
- identify a plurality of data containers configured to store a plurality of deduplicated data segments that are referenced by a plurality of data objects within a deduplicated data system;
- maintain a plurality of reference databases, the plurality of reference databases comprising:
  - a first reference database that is configured to store information specifying which data objects within the plurality of data objects reference at least one data segment within a first subset of the plurality of data containers;
  - a second reference database that is configured to store information specifying which data objects within the plurality of data objects reference at least one data segment within a second subset of the plurality of data containers, the second subset differing from the first subset;
- determine that a data object references at least one data segment within a first data container within the first subset of the plurality of data containers but that the data object does not reference any data segment within a second data container within the second subset of the plurality of data containers;

update the first reference database with information specifying that the data object references at least one data segment within at least one data container within the first subset of the plurality of data containers.

18. The non-transitory computer-readable-storage medium of claim 17, wherein the one or more computer-readable instructions further cause the computing device to detect a backup image introduced to the deduplicated data system by a backup operation, the backup image comprising the data object;

wherein the one or more computer-readable instructions cause the computing device to update the first reference database before marking the backup operation as successful.

19. The non-transitory computer-readable-storage medium of claim 17, wherein the one or more computer-readable instructions further cause the computing device to:

identify a corrupted reference database within the plurality of reference databases;

while rebuilding the corrupted reference database, keep the deduplicated data system online to allow at least one of:

adding at least one data object to the deduplicated data system;

retrieving at least one data object from the deduplicated data system;

removing at least one data object from the deduplicated data system.

20. The non-transitory computer-readable-storage medium of claim 19, wherein the one or more computer-readable instructions cause the computing device to identify the corrupted reference database by causing the computing device to check a reference within a selected data object within the plurality of data objects that points to a referenced data segment within the plurality of data segments stored within a corresponding data container within the plurality of data containers and determine that the corrupted reference database does not correctly indicate that the selected data object references data stored within the corresponding data container.

* * * * *